United States Patent Office 2,894,718
Patented July 14, 1959

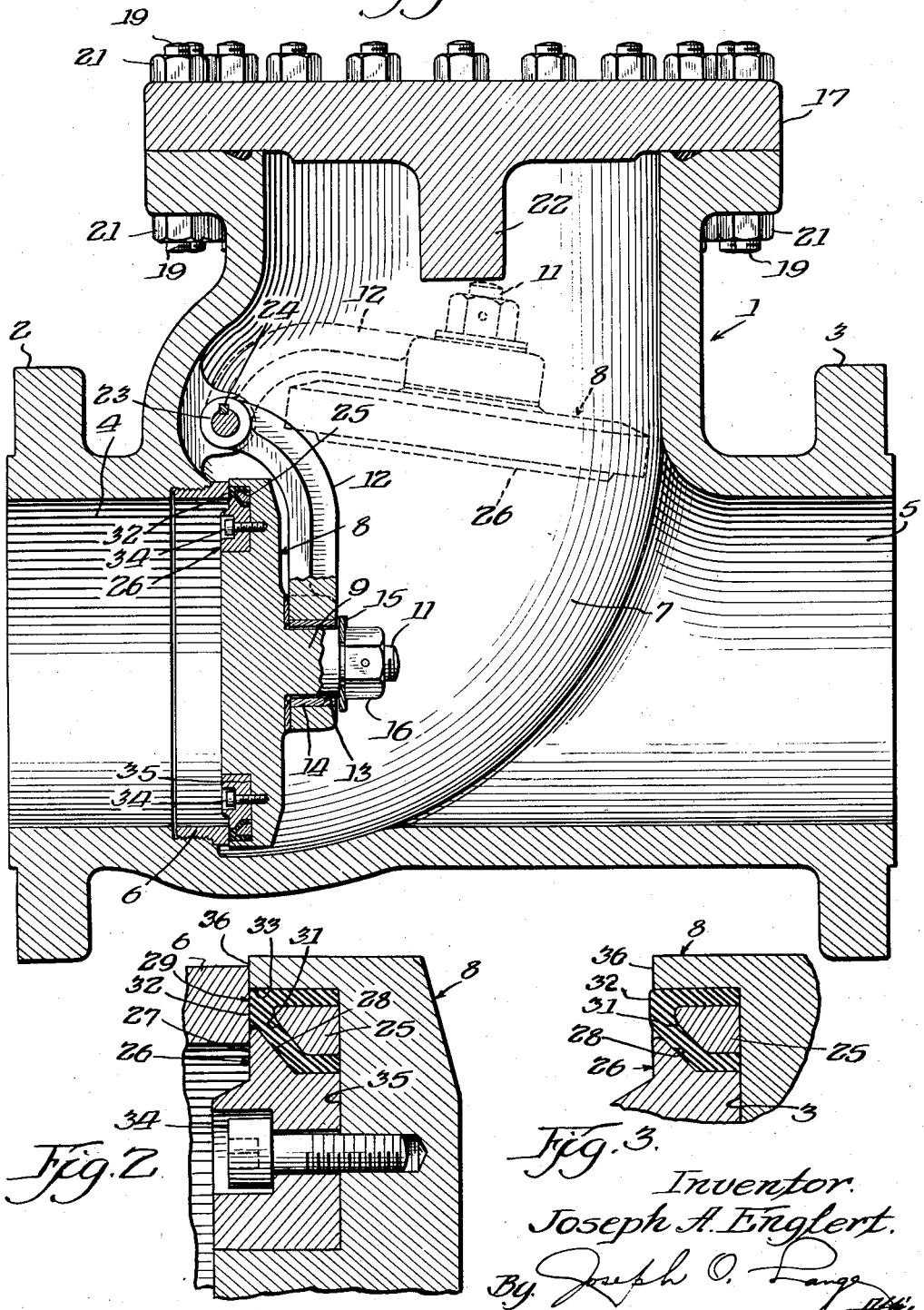

2,894,718

VALVE SEAT CONSTRUCTION

Joseph A. Englert, Chicago, Ill., assignor to Crane Co., Chicago, Ill., a corporation of Illinois Application March 30, 1955, Serial No. 498,076

6 Claims. (Cl. 251—357)

This invention relates generally to a valve seat construction, and, more particularly, it is concerned with a novel means of providing a fluid-tight seal at the valve seat in which substantial mechanical or fluid pressure loading is sustainable.

Another object is to provide for a sealing means in a valve seat, whereby fluid pressure escape blow-out cannot occur, such as is possible for example on forced-in or molded-in types of valve seals currently being used.

Another object is to provide for a sealing member in a valve disc or closure member in which comparatively easy or convenient and economic replacement thereof is provided.

A further object is to provide for a valve construction in which provision is made for a valve seat capable of withstanding high fluid pressures and extreme degrees of velocity flow in service.

Other objects and advantages will become more readily apparent upon proceeding with the specification read in light of the accompanying drawings, in which:

Fig. 1 is a sectional assembly view of a preferred embodiment of my invention.

Fig. 2 is a magnified fragmentary view of the novel sealing element employed.

Fig. 3 is a view similar to Fig. 2 showing the sealing means in an unseated position.

Similar reference numerals refer to similar parts throughout the several views.

Referring now to Fig. 1, a valve body or casing, generally designated 1 is shown, having the usual inlet and outlet connecting end flanges 2 and 3 respectively communicating with the inlet port 4 and outlet passage 5. The valve body is provided, as indicated, with a body seat ring 6, which, however, may be as a separate member as illustrated or it may be integral with the body, if desired.

Mounted for swinging movement within the body chamber 7, or otherwise pressure responsive, a disc or closure member, generally designated 8, is provided having a hub extension 9 which is provided with a threaded shank 11 about which is mounted an apertured hinge 12 provided with an opening 13 fitted preferably with a bushing 14 to encircle and secure the portion 9. It will be noted that the height of the hub portion 9 is preferably greater than the thickness of the hinge 12 so as to allow relatively loose mounting to permit easy or free rotatability of the disc member 8 around the hub 9. To retain the valve hinge in position on the closure member 8, a washer 15 and a threaded nut 16 is mounted on the threaded shank 11. To enclose the body chamber 7 and also limit the upward swinging movement of the combined hinge and closure member 8, a cap 17 is provided which is held in place by means of the bolts and nuts 19 and 21 and provided thereby to close the said chamber 7 in fluid sealed manner. Depending from a central portion of the cap 17, a stop 22 is provided which, as indicated, contacts the shank 11 of the closure member 8 in the wide open position of the valve. Transversely extending hinge pin 23 serves as the journalling means of support for the closure member 8 and is preferably locked for relative non-rotative movement with respect to the hinge 12 by means of the key 24.

Thus far, the description above given relates to a valve of substantially conventional design.

However, an important attribute of this invention lies in the novel valve seat sealing means, as more clearly shown in the magnified views of Figs. 2 and 3, in which it will be noted that the closure member 8 is provided with an annular recess 35 for the purpose of receiving a fluid sealing assembly comprising a disc seat retaining ring 26 and having an outer flange portion 27, preferably annularly tapered, as at 28, to receive the disc ring, generally designated 29. It will be noted that the said seat ring is of U-configuration in its cross-section in which the hollow interior of the U-portion receives snugly a rigid supporting ring 25 for the purpose of sustaining and preventing the collapse of the disc ring 29, the latter member having a slightly projecting seating surface as at 32, better shown in Fig. 3, for effecting the fluid sealing contact with the said seat ring 6 as shown in Fig. 2. It will be noted that the lower portion of the ring of U-configuration is extruded slightly and projects between the retaining annular surface 33 defining the outer limts of the recess base surface 35 and the annular tapered surface 28 of the retaining ring 26. It will also be understood that the ring 29 with its rigid core 25 substantially fills the annular space provided by the assembly of the retaining ring 26 with the closure member 8, the resilient ring being deformed and stressed by said retaining ring while held between surfaces 28, 33 and 35. The ring 26 is preferably held in place by means of a plurality of annularly spaced apart retaining screws 34 to hold the retaining ring in shouldered relation against the recess surface 35. This is important because it assures holding the ring 29 under predetermined load and also avoids the danger of crushing or objectionably distorting the ring because of the said slight extrusion taking place. At the same time, the groove receiving the ring 29 is of a constant dimension and the resilient ring is equally stressed throughout its cross-section. It is, of course, of such size and form as to receive the surplus projecting portion of the resilient member 29 when the valve is tightly closed, as shown in Fig. 2.

The number and size of the retaining screws 34 will, of course, vary, depending upon the size of the valve and service conditions to be encountered.

It will now be appreciated that the ring 29 retained between the outer peripheral wall surface 33 of the closure member 8 and the ring 26 and in conjunction with the vertical component of mechanical loading provided by the tapered annular surface 28 of the retainer ring 26 provides a resilient, flexible and predeterminately distortable seating means for the closure member 29. More specifically, the retaining groove therein as defined by the annular surfaces 33, 28 and 35 provides a positive or fixed groove to prevent fluid leakage around the sealing member 29. It will be understood, of course, that line fluid trapped in seating the valve beyond the annular surface 33 and along the outer periphery 36 of the retaining ring permits an application of line fluid pressure against the seating surface of the seat ring 6 to allow for a more substantial fluid sealing contact beyond that heretofore accomplished, the ring 29 actually being moved radially endward toward the inclined surface 28. At the same time, the retaining ring 29 is suitably held by means of the annular inclined surface 28 and the inner surface of the ring 26 against the base surface 35 of the ring retaining groove to assure of proper compression application without danger of crushing the ring 29. It should be noted too that the surface of the solid core at 31 also assists materially in preserving the configuration of the U-shaped ring 29 preventing its distortion or collapse. It is obvious that as referred to above and by virtue of the fact that the retaining ring 26 pulls up to a shoulder as at surface 35 the sealing ring 29 cannot be objectionably crushed as to render it worthless in service.

In summary, and in considering in greater detail the operation of this invention, it will be apparent that the disc seat retaining ring 26 and the inclined surface 28 thereon actually function in a dual capacity in that said ring 26 acts as a compression member and provides the required amount of compression load to cause the sealing surface 32 of the seal ring to extend beyond the annular surface 36 and also the flange portion 27 of the said disc retaining ring. The surface 28 also acts as a secondary seal should line fluid pressure enter behind the seal ring 29. If such condition should occur, it will be clear that the higher the extent of such pressure the greater will be the compression load exerted at the bearing contact between the seal ring 29 and the inclined surface 28.

While only a single embodiment has been shown, it will, of course, be appreciated that the drawing shown is for purpose of illustration of the application of the spirit of the invention and not for purpose of limitation. It is, therefore, the intent that the invention should be measured by the scope of the appended claims.

I claim:

1. In a valve, the combination of a seat, a closure member therefor, sealing means interposed between the seat and the said closure member, the said sealing means comprising a resilient annular member with a tapered annular surface and having a rigid annular core therewithin defining at least a portion of an outer transverse surface of said resilient annular member, the said resilient member and core being receivable in an annular recessed portion of the said closure member, the said resilient member and annular core making end contact in the same plane in said annular recessed portion of the closure member, annular retaining means for said sealing means mounted in shouldered relation to said closure member against an annular end surface of the said recessed portion, and having a tapered annular surface parallel to the tapered annular surface of said resilient annular member whereby to define a space therebetween to receive a portion of said resilient annular member, the said resilient member and the core completely filling an annular space defined respectively by said annular retaining means, the outer annular surface of said annular recessed portion and the surface of said recessed portion which defines the depth thereof, the said tapered annular surface of the retaining means bearing against the tapered annular surface of said resilient member so as to deform said resilient member.

2. In a valve, the combination of a seat, a closure member therefor, sealing means interposed between the seat and the said closure member, the said sealing means comprising a resilient annular member with a tapered annular surface and with an open annular portion, a rigid annular core snugly received therewithin, the core defining at least a portion of an outer transverse surface of said resilient annular member disposed in an annular recessed portion of the said closure member, the said resilient member and the annular core having surfaces terminating in the same plane in said annular recessed portion of the closure member, annular retaining means for said sealing means mounted in relation to said closure member to abut against an annular base surface of the said recessed portion, the said retaining means having a tapered annular surface substantially parallel to the tapered annular surface of said resilient annular member whereby to define an annular opening to receive predeterminately a sealing portion of said resilient annular member, the said resilient member and the core completely filling an annular space defined respectively by said annular retaining means, the outer annular surface of said annular recessed portion and the surface of said recessed portion which defines the depth thereof, the said tapered annular surface of the retaining means bearing against the tapered annular surface of said resilient member so as to deform said resilient member.

3. In a valve, the combination of a seat, a closure member therefor, sealing means interposed between the seat and the said closure member, the said sealing means comprising a resilient annular member of substantially U-configuration in cross-section with a tapered annular surface and having a rigid annular core therewithin with an inner tapered annular surface, the core on an opposite end surface defining at least a portion of a transverse annular surface of said resilient annular member, the said resilient member and the rigid core being receivable in an annular recessed portion of the said closure member, the said resilient member and the rigid annular core having end surfaces in substantially the same plane abutting a base surface in said annular recessed portion of the closure member, annular retaining means for said sealing means mounted in abutting relation to said closure member against said base surface in the said closure member recessed portion, the said retaining means having a tapered annular surface substantially parallel to the tapered annular surface of said resilient annular member whereby to define an annular space therebetween to receive a portion of said resilient annular member substantially in the plane of the seat contact portion of the sealing means, the said resilient member and the rigid core substantially filling an annular chamber defined respectively by said annular retaining means, the outer annular surface of said annular recessed portion and the surface of said recessed portion which defines the depth thereof, whereby upon positioning the said retaining means against said base surface of the closure member recessed portion the said tapered annular surface of the retaining means bears against the tapered annular surface of said resilient member so as to extrude said resilient member through said annular space.

4. In a valve, the combination of a seat, a closure member therefor, sealing means interposed between the seat and the said closure member, the said sealing means comprising a hollow resilient annular member with a tapered annular surface and an open annular end portion, a rigid annular core of polygonal cross-section received within the hollow portion of said resilient member, the core defining at least an end portion of a median transverse annular surface of said resilient annular member, the said resilient member and the core being receivable in an annular recessed portion of the said closure member, the said resilient member and the annular core making contact in the same plane in said recessed portion of the closure member against an end transverse surface, annular retaining means for said sealing means mounted in abutting relation to said closure member against an end transverse annular surface of the said recessed portion, the said retaining means having a tapered annular surface parallel to the tapered annular surface of said resilient annular member whereby to define at an inner portion an annular opening to receive a sealing portion of said resilient annular member, the said resilient member and the polygonal rigid core completely filling an annular chamber defined respectively by the tapered surface of said annular retaining means, the outer annular surface of said annular recessed portion and the peripheral surface of said recessed portion defining the depth of the latter portion, the said tapered annular surface of the retaining means bearing against the tapered annular surface of said resilient member so as to deform said resilient member to a predetermined maximum degree upon positioning said retaining means in said abutting relation to the said closure member.

5. In a valve, the combination of a seat, a closure member therefor, sealing means interposed between the seat and the said closure member, the said sealing means comprising a resilient annular member with a tapered annular surface and having a rigid annular core therewithin defining at least a portion of an outer transverse surface of said resilient annular member, the said resilient member and the core being receivable in an annular recessed portion of the said closure member, the said resilient member and the annular core making end contact in the same plane in said annular recessed portion of the closure member, annular retaining means for said sealing means mounted in shouldered relation to said closure member against an annular end surface of the said recessed portion, and having a tapered annular surface parallel to the tapered annular surface of said resilient annular member whereby to define a space therebetween to receive a portion of said resilient annular member, the said resilient member and the rigid core substantially filling an annular chamber defined respectively by said annular retaining means, the outer annular surface of said annular recessed portion and the surface of said recessed portion which defines the depth thereof the said tapered annular surface of the retaining means bearing against the tapered annular surface of said resilient member so as to deform said resilient member, the said annular chamber having a relieved annular corner portion to receive a deformed portion of said resilient member upon tightly seating the valve closure member.

6. In a valve, the combination of a seat, a closure member therefor, sealing means interposed between the seat and the said closure member, the said sealing means comprising a resilient annular member with a tapered annular surface and having a rigid annular core therewithin defining at least a portion of an outer transverse surface of said resilient annular member, the said resilient member and the rigid core being receivable in an annular recessed portion of the said closure member, the said resilient member and annular core making end contact in the same plane in said annular recessed portion of the closure member, annular retaining means for said sealing means mounted in shouldered relation to said closure member bearing against an annular end surface of the said recessed portion, the said retaining means having a tapered annular surface parallel to the tapered annular surface of said resilient annular member with an inner peripheral cut-away edge defining an annular space therebetween to receive a portion of said resilient annular member when the closure member is tightly abutting the said seat, the said resilient member and core substantially filling an annular spaced defined respectively by said annular retaining means except for said cut-away edge portion, the outer annular surface of said annular recessed portion and the surface of said recessed portion which defines the depth thereof, the said tapered annular surface of the retaining member bearing against the corresponding oppositely disposed tapered annular surface of said resilient means so as to deform said resilient member to extend past the cut-away edge portion when the valve closure member is predeterminately seated tightly in abutting the said seat.

References Cited in the file of this patent

UNITED STATES PATENTS 2,678,187    Peters _____ May 11, 1954

FOREIGN PATENTS 499,981    Great Britain _____ Feb. 1, 1939
76,427    Norway _____ Mar. 13, 1950